United States Patent
Ha et al.

(10) Patent No.: US 8,311,370 B2
(45) Date of Patent: Nov. 13, 2012

(54) PORTABLE TERMINAL AND DATA INPUT METHOD THEREFOR

(75) Inventors: Tae-Young Ha, Seongnam-si (KR); Dong-Han Kim, Daejeon (KR)

(73) Assignee: Samsung Electronics Co., Ltd (KR)

( * ) Notice: Subject to any disclaimer, the term of this patent is extended or adjusted under 35 U.S.C. 154(b) by 1155 days.

(21) Appl. No.: 11/266,794

(22) Filed: Nov. 4, 2005

(65) Prior Publication Data
US 2006/0097985 A1    May 11, 2006

(30) Foreign Application Priority Data
Nov. 8, 2004 (KR) .......................... 10-2004-0090574

(51) Int. Cl.
*G06K 9/22* (2006.01)
*G09G 5/00* (2006.01)

(52) U.S. Cl. ......... 382/313; 382/276; 382/305; 345/169
(58) Field of Classification Search .................. 382/154, 382/276, 305, 312; 345/163–169, 179–183
See application file for complete search history.

(56) References Cited

U.S. PATENT DOCUMENTS

| | | | | | |
|---|---|---|---|---|---|
| 5,168,531 | A | * | 12/1992 | Sigel | 382/291 |
| 5,581,276 | A | * | 12/1996 | Cipolla et al. | 345/156 |
| 5,598,487 | A | * | 1/1997 | Hacker et al. | 382/313 |
| 5,767,842 | A | * | 6/1998 | Korth | 345/168 |
| 5,780,834 | A | * | 7/1998 | Havens et al. | 235/462.1 |
| 5,783,811 | A | * | 7/1998 | Feng et al. | 235/462.42 |
| 5,793,033 | A | * | 8/1998 | Feng et al. | 235/472.01 |
| 5,949,057 | A | * | 9/1999 | Feng | 235/472.01 |
| 5,999,185 | A | * | 12/1999 | Kato et al. | 345/420 |
| 6,060,722 | A | * | 5/2000 | Havens et al. | 250/566 |
| 6,118,449 | A | * | 9/2000 | Rosen et al. | 715/861 |
| 6,191,773 | B1 | * | 2/2001 | Maruno et al. | 345/158 |
| 6,323,942 | B1 | * | 11/2001 | Bamji | 356/5.01 |
| 6,392,632 | B1 | * | 5/2002 | Lee | 345/158 |
| 6,567,078 | B2 | * | 5/2003 | Ogawa | 345/179 |
| 6,590,573 | B1 | * | 7/2003 | Geshwind | 345/419 |

(Continued)

FOREIGN PATENT DOCUMENTS
CN           1361466           7/2002
(Continued)

OTHER PUBLICATIONS
Hong et al. "3D Virtual Colonoscopy" State Univesrity of NY @ Stony Brook, 1995 Biomedical Visualization Proceedings, pp. 1-7.*

(Continued)

*Primary Examiner* — Chan Park
*Assistant Examiner* — Mia M Thomas
(74) *Attorney, Agent, or Firm* — The Farrell Law Firm, P.C.

(57) ABSTRACT

A method and apparatus for receiving data from a virtual input device by detecting and analyzing the motion of a user input means simply using a two-dimensional image sensor without projecting the virtual input device. In a portable terminal for receiving data from a user input means through a virtual input device, an image sensor senses the image of the user input means. An image analyzer detects the position and motion of the user input means from the image. A data input decider decides the input data based on the position and motion. A display displays the image of the user input means together with the virtual input device. An initializer sets an initial motion range and an initial feature image for the user input means.

27 Claims, 9 Drawing Sheets

U.S. PATENT DOCUMENTS

| | | | | |
|---|---|---|---|---|
| 6,600,475 | B2 * | 7/2003 | Gutta et al. | 345/156 |
| 6,614,422 | B1 * | 9/2003 | Rafii et al. | 345/168 |
| 6,633,282 | B1 * | 10/2003 | Monroe | 345/179 |
| 6,661,920 | B1 * | 12/2003 | Skinner | 382/187 |
| 6,824,467 | B2 * | 11/2004 | Schlottmann et al. | 463/20 |
| 7,002,560 | B2 * | 2/2006 | Graham | 345/179 |
| 7,004,394 | B2 * | 2/2006 | Kim | 235/472.01 |
| 7,064,742 | B2 * | 6/2006 | Navab et al. | 345/156 |
| 7,102,615 | B2 * | 9/2006 | Marks | 345/156 |
| 7,164,411 | B2 * | 1/2007 | Keranen et al. | 345/156 |
| 7,167,158 | B2 * | 1/2007 | Silverbrook | 345/156 |
| 7,251,352 | B2 * | 7/2007 | Sauer et al. | 382/128 |
| 7,286,722 | B2 * | 10/2007 | Fujimoto et al. | 382/305 |
| 7,307,661 | B2 * | 12/2007 | Lieberman et al. | 348/333.1 |
| 7,315,649 | B2 * | 1/2008 | Kisuki | 382/187 |
| 7,337,410 | B2 * | 2/2008 | Lin | 715/773 |
| 7,379,560 | B2 * | 5/2008 | Bradski et al. | 382/103 |
| 7,487,468 | B2 * | 2/2009 | Tanaka et al. | 715/863 |
| 7,493,644 | B1 * | 2/2009 | Tanskanen | 725/62 |
| 7,499,569 | B2 * | 3/2009 | Sato et al. | 382/103 |
| 7,522,151 | B2 * | 4/2009 | Arakawa et al. | 345/156 |
| 7,774,075 | B2 * | 8/2010 | Lin | 700/17 |
| 8,027,518 | B2 * | 9/2011 | Baker et al. | 382/115 |
| 2002/0012450 | A1 * | 1/2002 | Tsujii | 382/103 |
| 2003/0092470 | A1 * | 5/2003 | Kurakane | 455/566 |
| 2003/0117485 | A1 * | 6/2003 | Mochizuki et al. | 348/14.01 |
| 2003/0176212 | A1 * | 9/2003 | Schlottmann et al. | 463/20 |
| 2004/0114725 | A1 * | 6/2004 | Yamamoto | 378/189 |
| 2004/0128012 | A1 * | 7/2004 | Lin | 700/100 |
| 2004/0170330 | A1 * | 9/2004 | Fogg | 382/232 |
| 2004/0188626 | A1 * | 9/2004 | Yamamoto | 250/370.09 |
| 2004/0245341 | A1 * | 12/2004 | Shimoda et al. | 235/462.46 |
| 2005/0190970 | A1 * | 9/2005 | Griffin | 382/209 |
| 2005/0249386 | A1 * | 11/2005 | Juh | 382/124 |
| 2005/0264527 | A1 * | 12/2005 | Lin | 345/156 |
| 2005/0289008 | A1 * | 12/2005 | Olivier et al. | 705/22 |
| 2006/0054704 | A1 * | 3/2006 | Fitch et al. | 235/472.01 |
| 2006/0082573 | A1 * | 4/2006 | Konno et al. | 345/419 |
| 2006/0097985 | A1 * | 5/2006 | Ha et al. | 345/156 |
| 2006/0274171 | A1 * | 12/2006 | Wang | 348/294 |
| 2007/0018966 | A1 * | 1/2007 | Blythe et al. | 345/173 |
| 2007/0115261 | A1 * | 5/2007 | Cho et al. | 345/168 |
| 2009/0033623 | A1 * | 2/2009 | Lin | 345/158 |
| 2010/0073329 | A1 * | 3/2010 | Raman et al. | 345/177 |
| 2010/0085478 | A1 * | 4/2010 | Yamamoto et al. | 348/452 |
| 2010/0091038 | A1 * | 4/2010 | Konno et al. | 345/653 |
| 2010/0245245 | A1 * | 9/2010 | Yamada et al. | 345/158 |

FOREIGN PATENT DOCUMENTS

| | | |
|---|---|---|
| EP | 1 160 651 | 12/2001 |
| JP | 06-083512 | 3/1994 |
| WO | WO 99/35633 | 7/1999 |

OTHER PUBLICATIONS

Avila et al. "VolVis: A Diversified Volume Visualization System" IEEE, 1994, pp. 1-8.*

He et al. "Virtual Input Devices for 3D Systems" IEEE, 1993, pp. 1-8.*

Google Scholar Search History—keyword search Jun. 28, 2010, pp. 1-3.*

Fehn "Depth Image Based Rendering (DIBR), Compression and Transmission for a New Approach on 3D TV" Stereoscopic Displays and Virtual Reality Systems XI SPIE vol. 5291 (2004) pp. 1-12.*

* cited by examiner

PORTABLE TERMINAL AND DATA INPUT METHOD THEREFOR

PRIORITY

This application claims priority under 35 U.S.C. §119 to an application entitled "Portable Terminal And Data Input Method Therefor" filed in the Korean Intellectual Property Office on Nov. 8, 2004 and assigned Serial No. 2004-90574, the contents of which are incorporated herein by reference.

BACKGROUND OF THE INVENTION

1. Field of the Invention

The present invention relates generally to a portable terminal and a data input method therefor, and in particular, to a method and apparatus for receiving data from a virtual input device by detecting and analyzing the motion of a user input means using a two-dimensional image sensor without projecting the virtual input device.

2. Description of the Related Art

Due to the miniaturization of portable terminals, typically an input device for a portable terminal has a limited input capability. For expanded input capability, an external expanded input device is connected to the portable terminal. For example, existing external input devices include the Qwerty keyboard, which is widely used, and a virtual input device.

FIG. 1 illustrates a conventional portable terminal connected to an external input device. Referring to FIG. 1, an external input device 12 is connected to a portable terminal 11 via a communication port, for wired/wireless communications. The user separately carries the external input device 12 and needs a connector 13 for connecting the external input device 12 to the portable terminal 11. Therefore, this type of external input device creates some inconvenience and prevents easy portability.

FIG. 2 illustrates another conventional portable terminal using a virtual input device. Referring to FIG. 2, the image of a virtual input device 22 is projected from a projector 27 of a portable terminal 21. When the user types on the virtual input device 22, sensors 23, 24, and 25 sense the motions of the user's hands 26 and recognize input data. This input method requires the projector 27 and the sensors 23, 24, and 25 for sensing the motion of the user's hands 26 and it is significant how accurately the sensors 23, 24, and 25 sense the hand motions.

A conventional portable terminal that receives data using a virtual input device generally senses hand motions three-dimensionally using a plurality of sensors, as illustrated in FIG. 2. However, the requirement of a projector and a plurality of sensors make the configuration of the portable terminal complicated and thus the portable terminal is not user-friendly. Additionally, the increase of components increases the cost of the device. Further, the use of the virtual input device is restricted depending on the positions of the projector and the sensors.

SUMMARY OF THE INVENTION

Therefore, the present invention has been designed to substantially solve at least the above problems and/or disadvantages and to provide at least the advantages below. Accordingly, an object of the present invention is to provide data reception using a virtual input device in a portable terminal without the need of connecting an additional external input device to the portable terminal.

Another object of the present invention is to provide data reception by analyzing a motion of a user without projecting an image of a virtual input device in a portable terminal.

A further object of the present invention is to provide virtual data reception by sensing a motion of a user by means of a two-dimensional image sensor in a portable terminal.

The above and other objects are achieved by providing a method and apparatus for receiving data from a virtual input device by detecting and analyzing the motion of a user input means simply using a two-dimensional image sensor without projecting the virtual input device.

According to one aspect of the present invention, in a portable terminal for receiving data from a user input means through a virtual input device, an image sensor senses the image of the user input means and outputs image data. An image analyzer detects position data and motion data of the user input means from the image data. A data input decider decides data received through the virtual input device based on the position data and the motion data. A display displays the image data of the user input means together with the virtual input device. An initializer sets an initial motion range for the user input means according to the ratio between the size of the virtual input device and the motion range of the user input means, and sets an initial feature image for the user input means according to the type of the virtual input device, for data input.

According to another aspect of the present invention, in a method of receiving data from a user input means through a virtual input device in a portable terminal having an image sensor and a display, an initial motion range is set for the user input means according to the ratio between the size of the display and the motion range of the user input means, and an initial feature image is set for the user input means according to the type of the virtual input device, for data input. Position data of the feature image of the user input means is detected from image data of the user input means sensed by the image sensor, and motion data of the feature image of the user input means is detected by analyzing optical flows of the feature image. Data received through the virtual input device is decided based on the position data and the motion data.

According to a further aspect of the present invention, in a portable terminal for receiving data from a user input means through a virtual input device, an image sensor senses the image of the user input means and outputs image data. An image analyzer detects the position and motion of the user input means from the image data. A data input decider decides data received through the virtual input device based on the position and the motion of the user input means. An initializer sets an initial image and an initial motion range for the user input means. A display for displaying the shape of the virtual input device can be further included. The initializer sets the initial motion range for the user input means according to the ratio between an area defined by points displayed on the display and a motion range of the user input means.

According to still another aspect of the present invention in a method of receiving data from a user input means through a virtual input device in a portable terminal having an image sensor and a display, an initial image and an initial motion range are set for the user input means. The image of the user input means is sensed. The position and motion of the user input means are detected from the sensed image. Data received through the virtual input device is decided based on the position and motion of the user input means.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The term used herein, "virtual input device" refers to an input device similar to a conventional input device, considered to be virtually existing outside a portable terminal, although it is not configured in hardware, compared to a standard input device by which a user enters data directly, such as a button, a mouse pad, or a touch screen having a hardware configuration. In order to use the virtual input device invisible to the eye, therefore, it is necessary to sense the image of a user input means that enters data on the virtual input device.

Additionally, "user input means" refers to means for data input by a user. It can be part of the human body such as a user's hand or fingers, or a tool to move with a user's hand like a pen or a rod-type object in the present invention.

Figure 1:
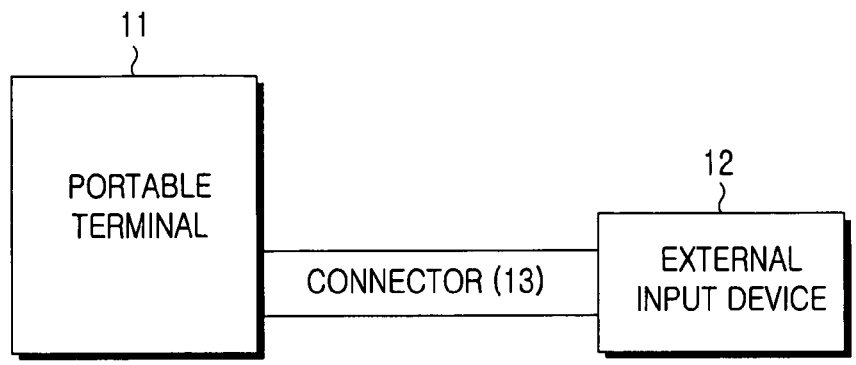
FIG. 1 illustrates a conventional portable terminal connected to an external input device.
Figure 2:
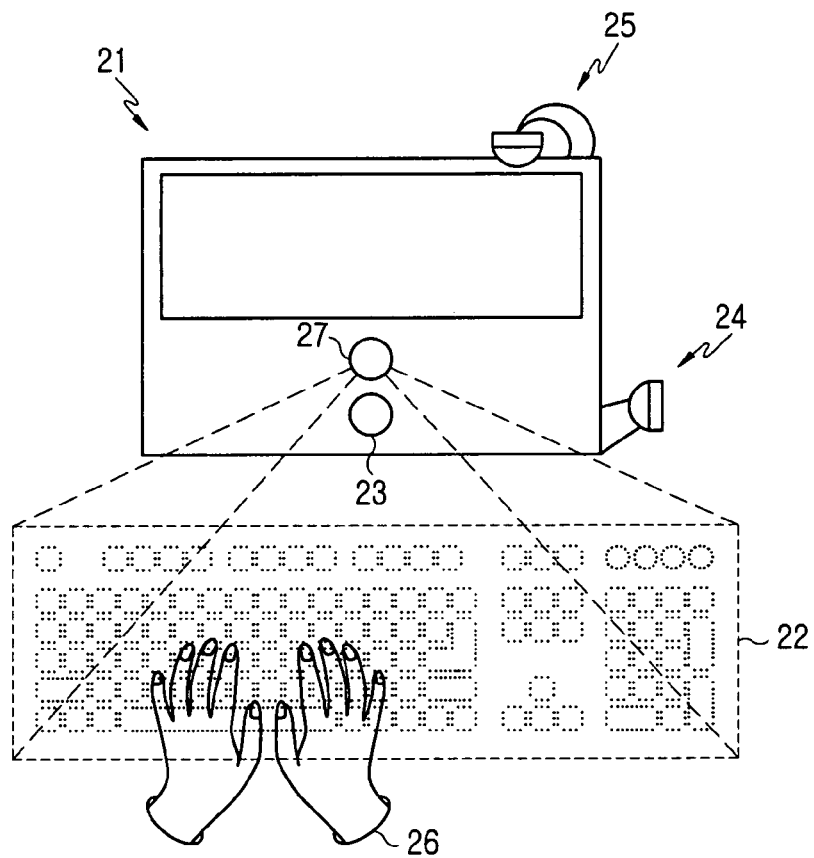
FIG. 2 illustrates another conventional portable terminal using a virtual input device.
Figure 3:
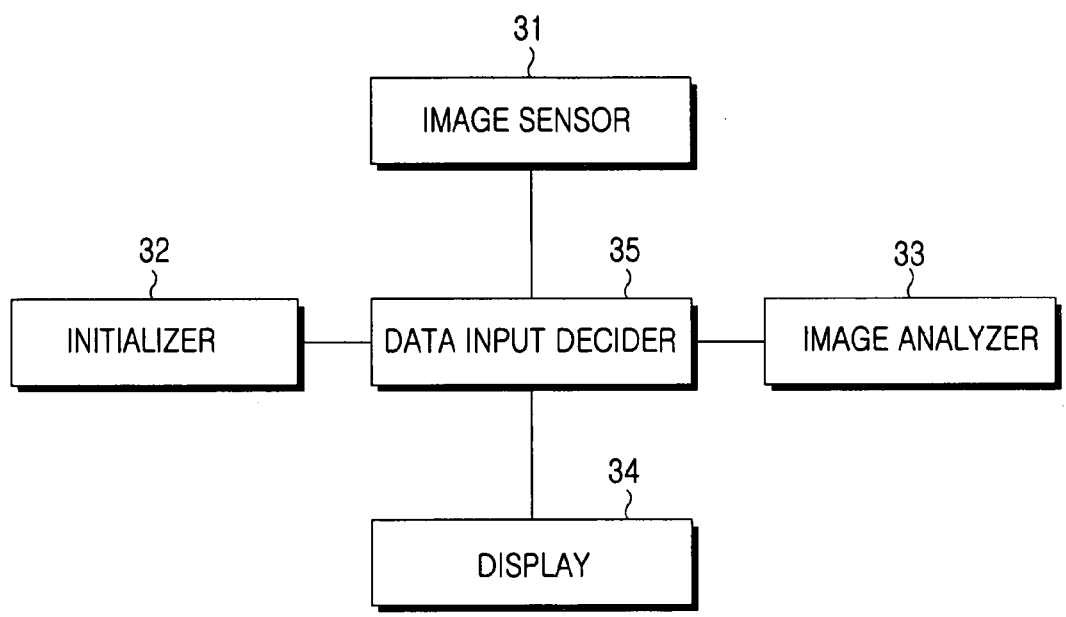
FIG. 3 is a block diagram illustrating a portable terminal according to the present invention.

FIG. 3 is a block diagram illustrating a portable terminal according to the present invention. Referring to FIG. 3, a portable terminal of the present invention includes an image sensor 31, an initializer 32, an image analyzer 33, a display 34, and a data input decider 35. The image sensor 31 is a two-dimensional sensor for sensing the motion of a user input means. The data input decider 35 enables the user to select the type of a virtual input device to be used, upon user request, and controls the initializer 32 according to the selected virtual input device. Because the selection is made in the state where a virtual input device is not available to the user yet, the user preferably selects the type of a virtual input device by pressing a specific key or through voice recognition. If only one type of virtual input device is available, this operation can be omitted. Any virtual versions of existing input devices such as a keyboard, a mouse, a joystick, and a remote controller can be set as virtual input device types.

The initializer 32 preliminarily detects the image and motion range of the user input means and sets an initial image and motion range for the user input means in conjunction with the image sensor 31, before the user enters data using the virtual input device. Because the motion of the user input means must be analyzed without projecting the virtual input device, it is important to find out the image and position of the user input means before data input through the virtual input device in the present invention. This is done to minimize errors that might be generated while the user enters data, while viewing the image of the user input means and the virtual input device on the display 34.

Figure 4:
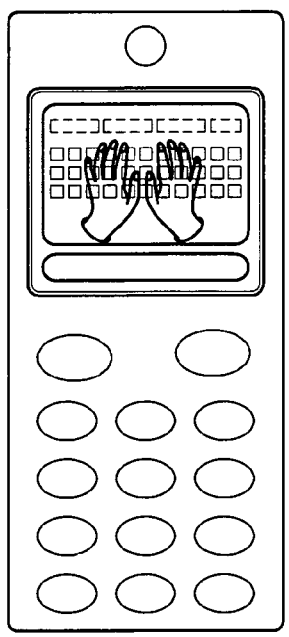
FIG. 4 illustrates an exemplary display for image initialization of an image input means according to the present invention.

The initialization is divided into an image initialization in which the image of the user input means is initially set to facilitate sensing of a data input motion from the motions of the user input means according to the type of the user input means, and a motion range initialization in which the motion range of the user input means is initially set. In the image initialization, because the type of the user input means is decided according to the type of the selected virtual input device and the user input means differs in size and shape depending on users, the image of the user input means is preliminarily sensed before data input, for more accurate data input. It can be contemplated that only the feature of a portion of the user input means required for data input is detected for each virtual input device type so that the amount of image data to be processed can be reduced when the image of the user input means is analyzed in relation to data input in the image analyzer 33. For example, if the user selects a keyboard as the virtual input device, the display 34 displays the image of the keyboard together with a hands image as the user input means, as illustrated in FIG. 4. The user then aligns his hands with the hands image and the initializer 32 memorizes the shape of the user's fingers. Because the keyboard inputs data by finger touch, the initializer 32 memorizes especially fingernail portions. The image analyzer 34 analyzes only the image of the finger nail portions set by the initializer 32 from received image data of the user input means, rather than processes the entire image data. This image initialization can be repeated to increase initialization accuracy.

Figure 5:
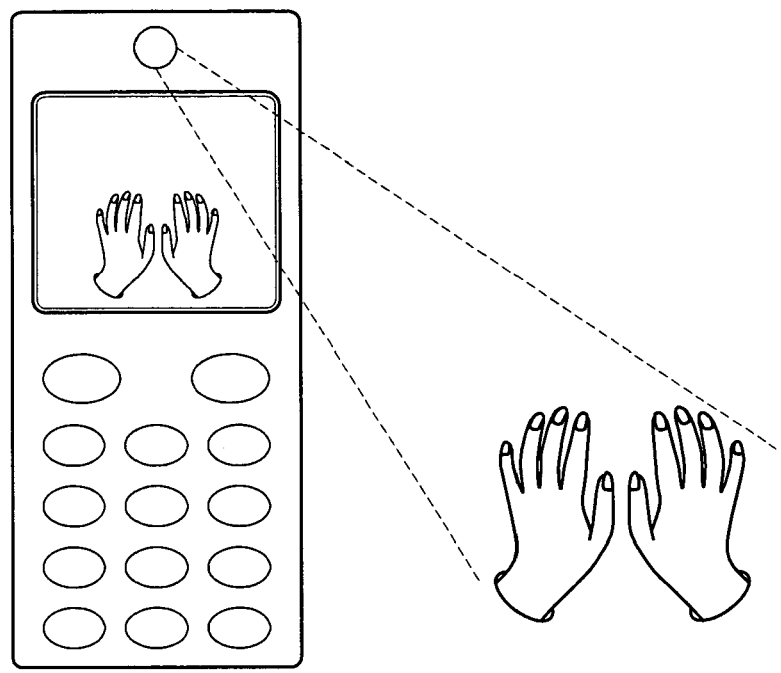
FIG. 5 illustrates an exemplary display for motion range initialization of the image input means according to the present invention.
Figure 6:
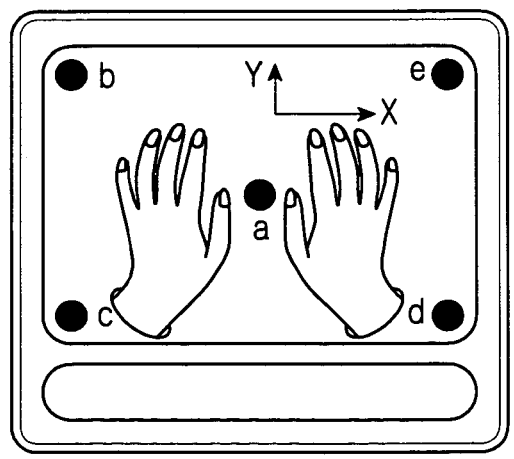
FIG. 6 illustrates an example of displaying the image of the user input means and points needed for initialization on the display for prompting the user to select corresponding initialization points.
Figure 7:
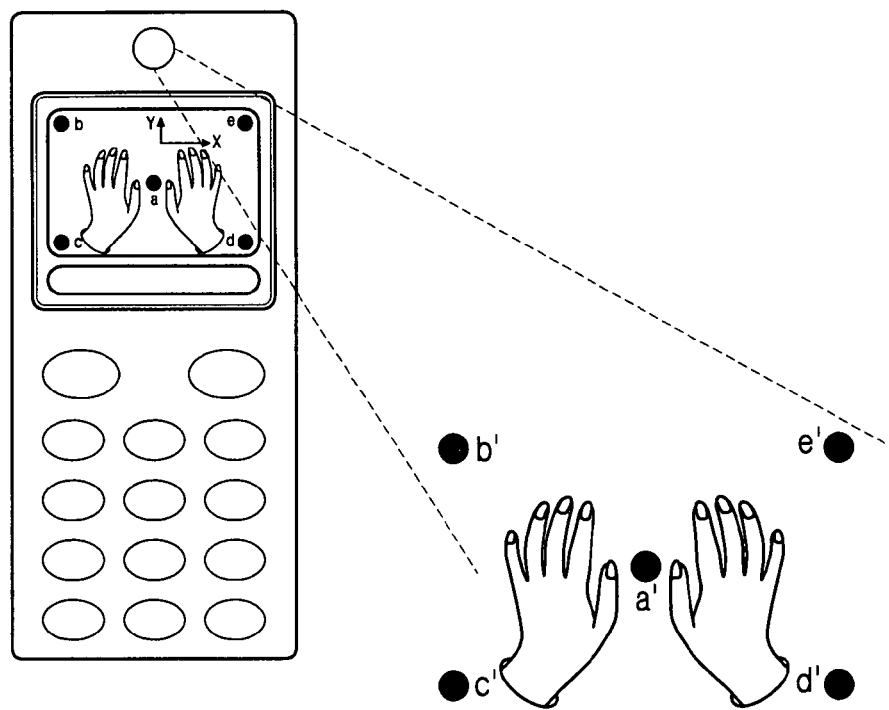
FIG. 7 illustrates an example of a user manipulation for the motion range initialization of the user input means.

FIG. 5 illustrates an exemplary display for motion range initialization of the image input means according to the present invention. In the motion range initialization, as illustrated in FIG. 5, the ratio between the screen size of the display 34 and the motion range of the user input means over the virtual input device is calculated and the user input means is displayed on the screen according to the ratio. Accordingly, the motion range of the user input means is initialized along x and y axes. The initializer 32 displays the image of the user input means and points needed for initialization on the display 34 and prompts the user to select corresponding initialization points. For example, referring to FIG. 6, points a, b, c, d, and e are displayed on the display 34 and the user touches points a, b, c, d, and e with the user input means (here, hands) where the virtual input device will be used. Referring to FIG. 7, the user actually presses points a', b', c', d', and e' where the virtual input device is to be used. The image sensor 32 senses those points and the initializer 32 calculates the ratio between the area defined by the points a, b, c, d, and e and the area defined by the points a', b', c', d', and e' and determines the motion range of the user input means.

The above-described initialization process can be performed for any type of virtual input device. For example, although a keyboard for a traditional computer and a keyboard for a small-size terminal like a personal digital assistant (PDA) are different in size, the initialization according to the present invention enables those keyboards to be displayed on the display 34 based on the size ratios between the keyboards and the screen size. Also, to make the initialization more accurate, the motion range initialization for the user input means can be repeated.

Similarly to selection of the virtual input device type, the image initialization and the motion range initialization can be performed when the user requests the initializations using a specific key or through voice recognition. Because these initializations are performed after the selection of the virtual input device type, they can be performed through a menu set for the virtual input device on the display 34.

After the initializations, the selected virtual input device and the user input means are displayed on the display 34. Therefore, the user enters data over the virtual input device while viewing his input means on the display 34.

The image analyzer 33 analyzes the position and motion of the user input means from the image data received from the image sensor 31 by edge detection, color detection, and optical flow analysis. For this purpose, as illustrated in FIG. 8, the image analyzer 33 is provided with an edge detector 81, a color detector 82, and an optical flow analyzer 83.

Figure 8:
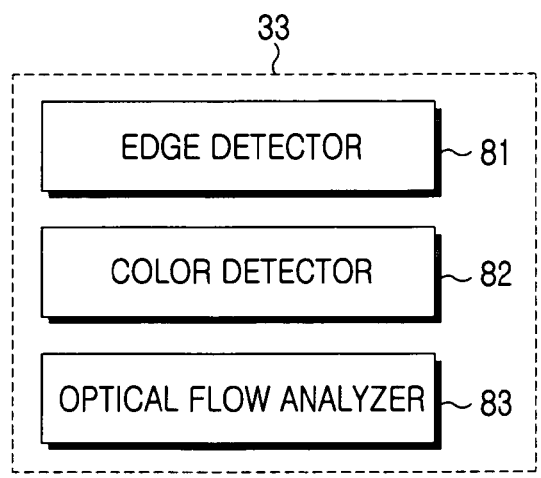
FIG. 8 is a block diagram of an image analyzer illustrated in FIG. 3.
Figure 9:
FIG. 9 illustrates an example of original image data recognized according to the present invention.
Figure 10:
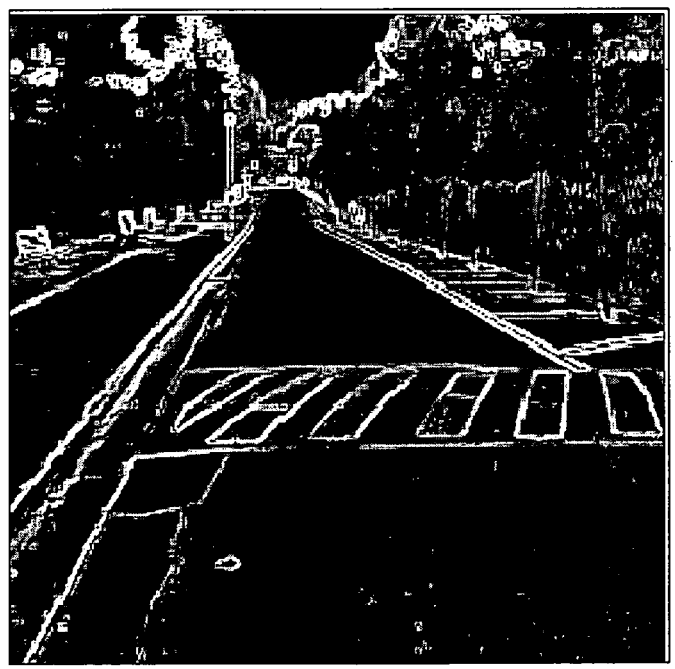
FIG. 10 illustrates an example of edge-detected image according to the present invention.

Referring to FIG. 8, the edge detector 81 determines the position of the user input means by detecting edges from the image data. At the edges of image data being a distribution of light, the pixel value changes considerably and another object or side with a different brightness begins. The edge detector 81 calculates the difference in brightness between adjacent pixels and if the difference is equal to or greater than a predetermined threshold, it determines them as an edge. For example, if edges are detected from an original image illustrated in FIG. 9, the boundaries of objects and a background in the image become more conspicuous as illustrated in FIG. 10.

Figure 11:
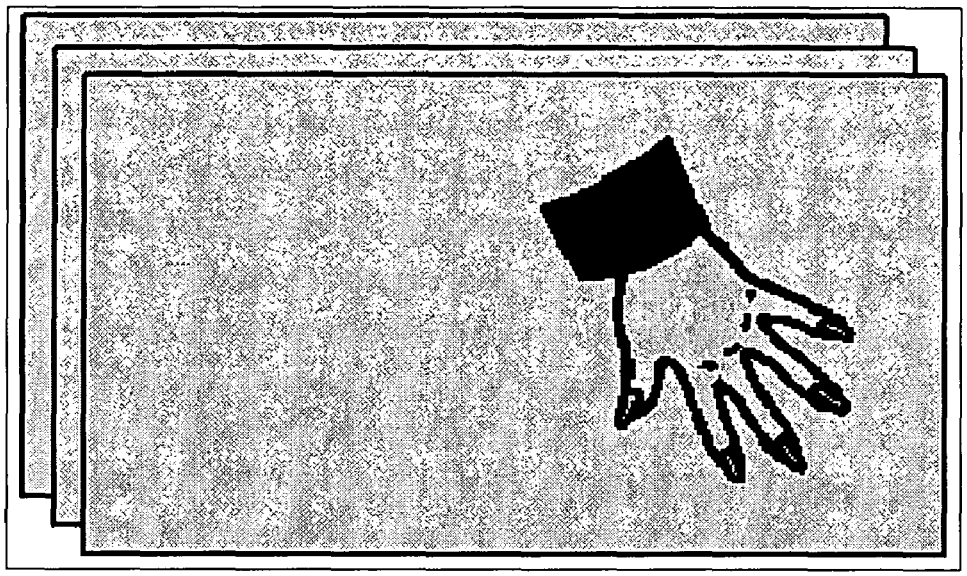
FIG. 11 illustrates another example of original image data recognized according to the present invention.

The color detector 82 detects colors from the image data and determines the position of the user input means. For color detection, the ranges of the color components of an object, i.e., a luminance component Y and two chrominance components U and V are set, the pixel colors of the image data are compared with the color threshold ranges, the processed pixels are divided by group and by size, and then the position of the user input means is calculated by a center-of-area method. More specifically, color ranges are set for the respective color components of an object (i.e., the user input means). For of an RGB (Red, Green, and Blue) color space, the upper and lower bounds of the RGB components are set, preferably using the histogram distributions of the colors. Each pixel of the two-dimensional image data is compared with the color ranges and the positions of all pixels falling within the color ranges are stored. Detection of the colors of a user's hand as the user input means from an original image illustrated in FIG. 11 results the image illustrated in FIG. 12.

In accordance with the present invention, either the edge detection or the color detection is available to determine the position of the user input means. Preferably, both detection methods are used to locate the user input means with accuracy. That is, the position of the user input means is finally determined using data output from the edge detector 81 and the color detector 82.

Figure 12:
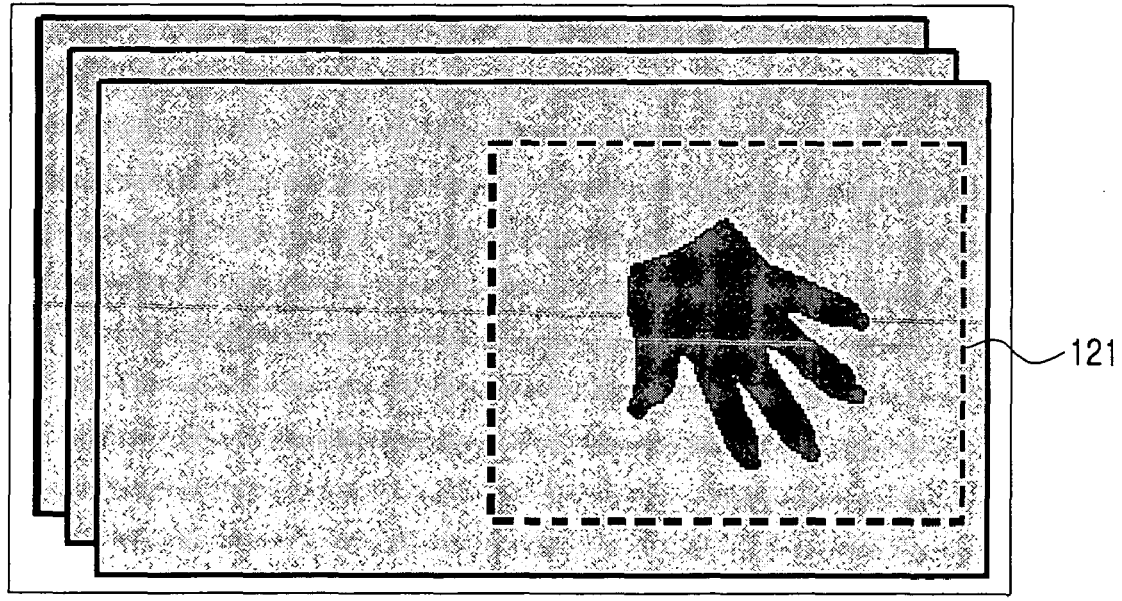
FIG. 12 illustrates an example of color-detected image data according to the present invention.
Figure 13:
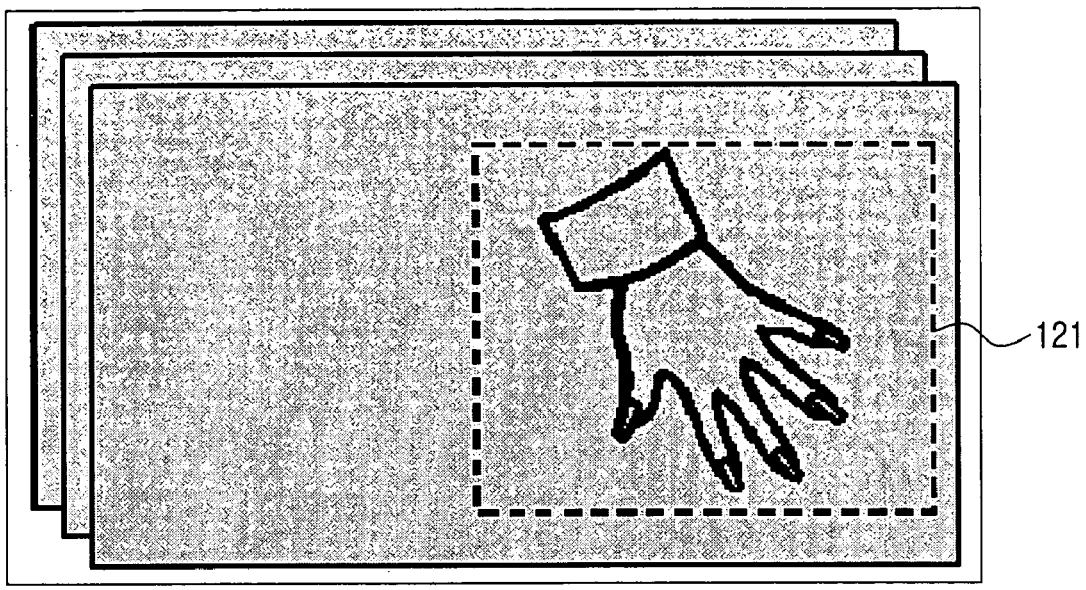
FIG. 13 illustrates another example of edge-detected image data according to the present invention.

For example, the position of the user input means is detected from the whole image data received from the image sensor 31 in the color detection method which takes a relatively short time and this portion is set as a search area 121, as illustrated in FIG. 12. Then, the edge detection method is applied to only the image within the search area 121 in the whole image data as illustrated in FIG. 13, thereby detecting the position of the user input means more accurately.

If the virtual input device is a keyboard and the user input means is the user's hands, the color detector 82 detects the positions of the hands from the whole image and the edge detector 81 detects the edges of the hands at the detected positions. Therefore, the positions of fingers directly related to typing are detected accurately and fast.

The edge detection and color detection are performed under the control of the data input decider 35. Depending on the types of the virtual input device and the user input means, the edge detector 81 and the color detector 82 are appropriately used so as to locate the user input means with accuracy.

The optical flow analyzer 83 analyzes the motion of the user input means using an optical flow. Accordingly, a data input motion can be detected based on the position of the user input means detected by the edge detector 81 and the color detector 82. However, for a more accurate analysis, the present invention further utilizes optical flows.

An optical flow, which is essential in detection of a moving object, refers to a speed vector, that is, the relative displacement of a pixel between adjacent image data. Using the optical flow, the mapping relationship between successive frames at a predetermined position is extracted in continuous image data. Therefore, the optical flow makes it possible to distinguish a data input motion of the user input means from any other motion in the present invention.

Figure 14:
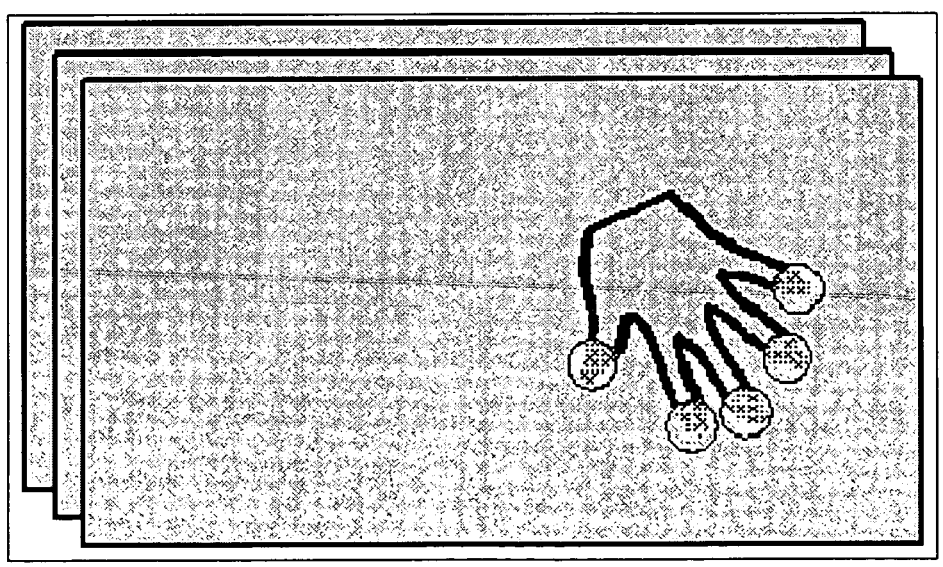
FIG. 14 illustrates an example of image data in which a final position is detected according to the present invention.

More specifically, a data input motion, like typing on a keyboard or button pressing, is characterized in that the motion gets static rapidly at a data input time point, compared to any other standard motion. Therefore, the data input motion is differentiated from any other standard motion by means of optical flows in the present invention. Using a keyboard as the virtual input device, fingertips are the most important portions of the user input means. Therefore, once the positions of the fingers are determined by edge detection and color detection, as illustrated in FIG. 14, the optical flow at the fingers portion is calculated, to thereby determine easily if data has been input.

Figure 15:
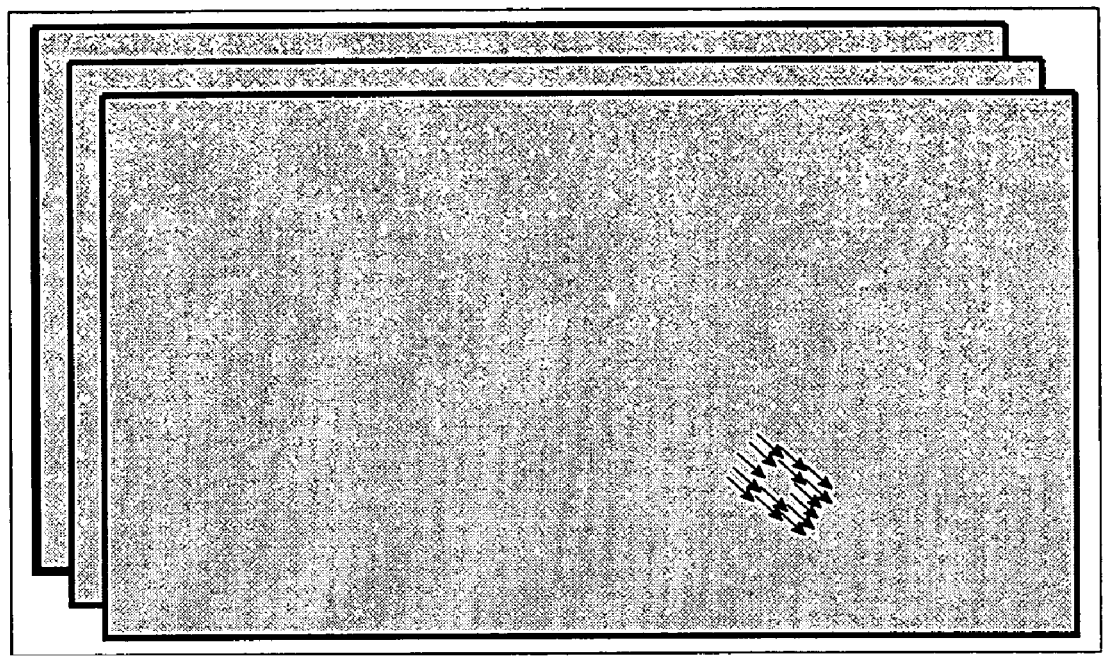
FIG. 15 illustrates an example of optical flow analysis according to the present invention.

FIG. 15 illustrates a difference from subtracting the optical flow of the previous frame image data from that of the current frame image data to obtain the optical flow of the fingers portion. That is, the present invention is based on the principle that the optical flow variation rate of a finger involved in data input is different from that of the other fingers. The number of frames from which optical flows are detected varies depending on the types of the virtual input device and the user input means. Combining the optical flow detection result with the above-described edge detection and color detection results leads to more accurate detection of the motions of the user input means.

The image analyzer 33 can analyze the motion of the user input means by learning the habit and input pattern of the user using learning software.

If the optical flow variation rate is equal to or greater than a predetermined threshold, the data input decider 35 determines that the user input means has made a data input motion based on information about the position and motion of the user input means received from the image analyzer 33. It detects input data by comparing the detected position of the user input means with that of the user input means on the virtual input device displayed on the display 34, and commands the portable terminal to perform a function corresponding to the input data.

Additionally, the data input decider 35 determines if the user wants to use the virtual input device. If the user wants to use the virtual input device, the data input decider 35 controls the image sensor 31 and the initializer 32 to carry out initialization. Upon input of data from the user, the data input decider 35 controls the image analyzer 33 to analyze image data from the image sensor 31 in order to detect the input data (e.g., alphabet or digit in a keyboard).

In addition, the data input decider 35 displays image data from the image sensor 31 on the display 34 according to the shape of the virtual input device and the motion of the user input means so that the user can easily recognize the motion of the user input means and accurately select data on the virtual input device. The data input decider 35 notifies the user of received data on the display 34 or by voice.

The user can view input data on the display 34 or hear the input data by voice. Further, the user can cancel the input data, input the next data, or end the data input. For example, if the user intends to enter letter A but the data input decider 35 notifies him of the input of letter S, the user cancels letter S by pressing a cancel button on the virtual input device and then enters the next data. If the data input decider 35 notifies him of the input of letter A, the user then enters the next data.

Figure 16:
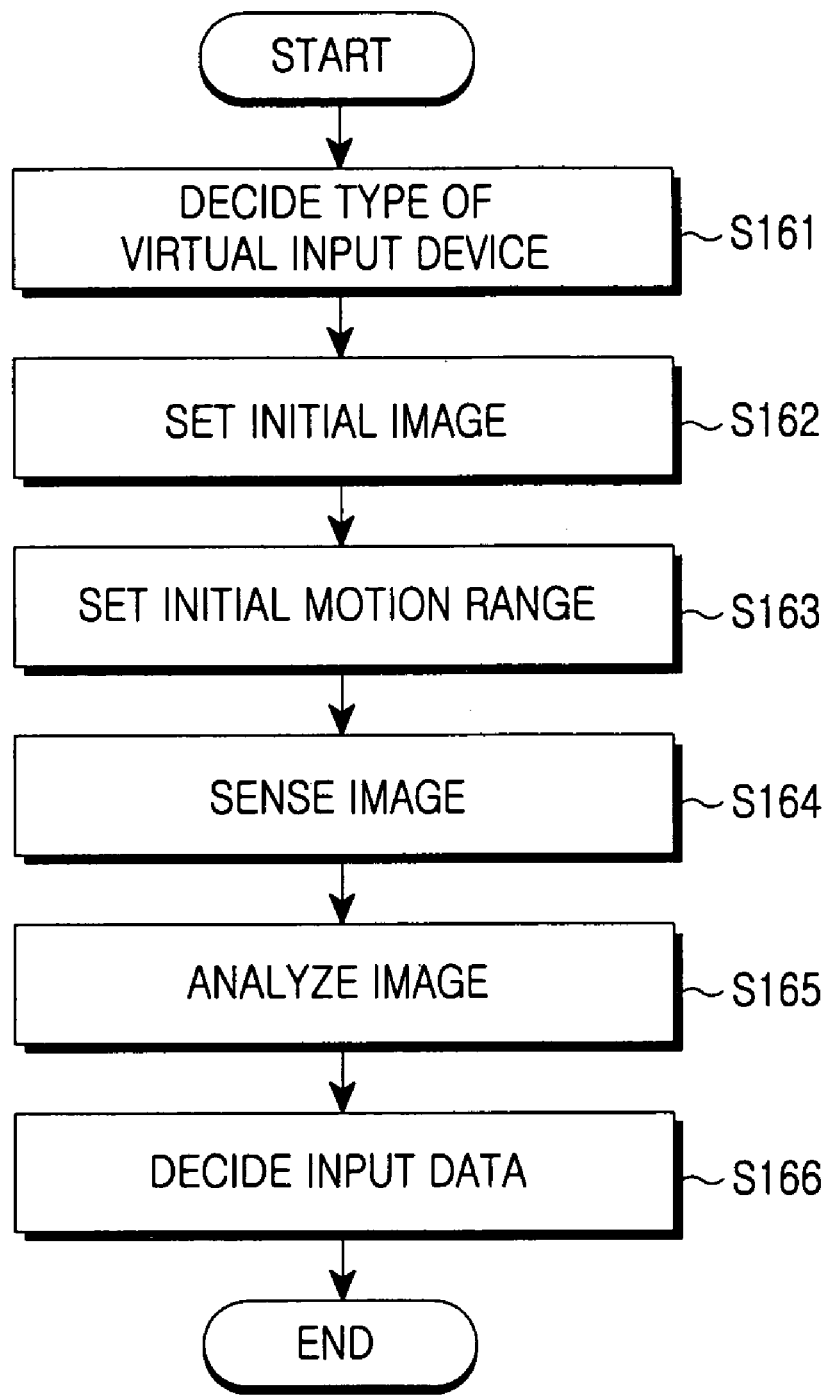
FIG. 16 is a flowchart illustrating a data input method using a virtual input device according to the present invention.

FIG. 16 is a flowchart illustrating a data input method in the portable terminal according to the present invention. Referring to FIG. 16, if the user is to use a virtual input device, the data input decider 35 prompts the user to select a virtual input device in step S161. The initializer 32 performs an image initialization for a user input means according to the selected virtual input device in step S612 and then a motion range initialization for the initial image of the user input means in step S613.

When needed, steps S162 and S613 can be repeated to increase the accuracy of image recognition and analysis. If the portable terminal provides only one type of virtual input device, step S161 can be omitted.

After step S163, the image sensor 31 senses the image of the user input means in real time in step S164. In step S165, the image analyzer 33 detects the position and motion of the user input means by analyzing the sensed image data.

The data input decider 35, if determining that a data input motion has been made based on the analyzed motion data in conjunction with the position of the user input means, determines input data by comparing the detected position of the user input means with that of the user input means on the virtual input device displayed on the display 34 in step S166.

When needed, the data input decider 35 notifies the user of the detected input data on the display 34 or by voice to allow the user to check whether data has been accurately input. Alternatively, data can be continuously input by omitting the input data notification and check step.

In accordance with the present invention as described above, because a portable terminal receives data from a virtual input device without projecting the virtual input device, a user input means can make a motion without space restriction. Therefore, expandability of input data and user convenience can be achieved.

In addition, detection of the motion of an image using optical flows obviates the need for a plurality of image sensors and two-dimensional image data suffices to analyze an image motion. Consequently, the configuration of the portable terminal that provides the virtual input device is simplified and the amount of image data to be processed is reduced.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A portable terminal for receiving data from a user input means, comprising:
   a two-dimensional image sensor for sensing an image of the user input means along x and y axes through a virtual input device and outputting image data of the user input means;
   an image analyzer for detecting position data and motion data of the user input means from the image data;
   a data input decider for determining data received through the virtual input device based on the position data and the motion data;
   a display for simultaneously displaying the image data of the user input means and the virtual input device; and
   an initializer for setting an initial motion range for the user input means according to a ratio between a size of the display and a motion range of the user input means, and setting an initial feature image for the user input means according to a type of the virtual input device, for data input.

2. The portable terminal of claim 1, wherein the initializer calculates the ratio using points displayed on the display and image data of the points input by the user input means.

3. The portable terminal of claim 1, wherein the image analyzer comprises:
   an edge detector for detecting the position data of the user input means by utilizing edge detection of the image data;
   a color detector for detecting the position data of the user input means by utilizing color detection of the image data; and
   an optical flow analyzer for detecting the motion data of the user input means by analyzing optical flows of the image data.

4. The portable terminal of claim 3, wherein the optical flow analyzer analyzes an optical flow variation rate in a plurality of frames of the image data.

5. The portable terminal of claim 4, wherein the data input decider determines that data has been received from the user input means, if the optical flow variation rate is at least equal to a threshold at which a data input motion of the user input means can be detected.

6. A method of receiving data from a user input means in a portable terminal having an image sensor and a display, comprising the steps of:
   setting an initial motion range for the user input means according to a ratio between a size of the display and a motion range of the user input means by using the image sensor, wherein the image sensor is a two-dimensional image sensor for sensing an image of the user input means along x and y axes through a virtual input device;
   setting an initial feature image for the user input means according to a type of the virtual input device, for data input;
   detecting position data of a feature image of the user input means from image data of the user input means sensed by the image sensor;

detecting motion data of the feature image of the user input means by analyzing optical flows of the feature image; and determining data received through the virtual input device based on the position data and the motion data.

7. The method of claim 6, wherein the step of setting the initial motion range for the user input means comprises the step of calculating a ratio using points displayed on the display and image data of points input by the user input means.

8. The method of claim 6, wherein the step of detecting the position data of the feature image of the user input means comprises the step of detecting the position data of the user input means by utilizing edge detection of the image data.

9. The method of claim 6, wherein the position data of the user input means is detected by utilizing color detection of the image data.

10. The method of claim 6, wherein the motion data is detected by analyzing an optical flow variation rate in a plurality of frames of the image data.

11. The method of claim 10, wherein the step of determining the data received through the virtual input device comprises the step of determining that data has been received from the user input means, if the optical flow variation rate is at least equal to a threshold at which a data input motion of the user input means can be detected.

12. The method of claim 6, wherein the image sensor is disposed in the portable terminal.

13. The method of claim 6, further comprising the step of determining whether to repeat the steps of setting the initial motion range and setting the initial feature image.

14. The method of claim 6, further comprising the step of providing a menu by which the type of the virtual input device is selected before the step of setting the initial motion range.

15. The method of claim 6, further comprising the steps of:
notifying a user of the determined data; and
providing a menu by which the user checks the determined data.

16. A portable terminal for receiving data from a user input means, comprising:
a two-dimensional image sensor for sensing an image of the user input means along x and y axes and outputting image data of the user input means through a virtual input device;
an image analyzer for detecting position and motion of the user input means from the image data;
a display for simultaneously displaying the image data of the user input means and the virtual input device;
a data input decider for determining data received through the virtual input device based on the position and the motion of the user input means; and
an initializer for setting an initial image and an initial motion range for the user input means,
wherein the initializer sets the initial motion range for the user input means according to a ratio between a size of the display and a motion range of the user input means.

17. The portable terminal of claim 16, wherein the size of the display is determined according to an area defined by points displayed on the display.

18. The portable terminal of claim 16, wherein the image analyzer comprises:
an edge detector for detecting the position of the user input means by utilizing edge detection of the image data;
a color detector for detecting the position of the user input means by utilizing color detection of the image data; and
an optical flow analyzer for detecting the motion of the user input means by analyzing optical flows of the image data.

19. The portable terminal of claim 18, wherein the optical flow analyzer analyzes an optical flow variation rate in a plurality of frames of the image data.

20. The portable terminal of claim 19, wherein the data input decider determines that data has been received from the user input means, if the optical flow variation rate is at least equal to a threshold at which a data input motion of the user input means can be detected.

21. A method of receiving data from a user input means in a portable terminal having an image sensor and a display, comprising the steps of:
setting an initial image and an initial motion range for the user input means;
sensing an image of the user input means by using the image sensor, wherein the image sensor is a two-dimensional image sensor sensing the image along x and y axes through a virtual input device;
simultaneously displaying the sensed user input means and the virtual input device;
detecting position and motion of the user input means from the sensed image; and
determining data received through the virtual input device based on the position and the motion of the user input means,
wherein the initial motion range for the user input means is set according to a ratio between a size of the display and a motion range of the user input means.

22. The method of claim 21, wherein the ratio between the size of the display and the motion range of the user input means is calculated using points displayed on the display and image data of the points input by the user input means.

23. The method of claim 21, wherein the initial feature image of the user input means is set according to a type of the virtual input device.

24. The method of claim 21, wherein the position of the user input means is detected using edge detection of the image.

25. The method of claim 21, wherein the position of the user input means is detected using color detection of the image.

26. The method of claim 21, wherein the motion of the user input means is detected by analyzing an optical flow variation rate in a plurality of frames of the image.

27. The method of claim 26, wherein the step of determining the data received through the virtual input device comprises the step of determining that data has been received from the user input means, if the optical flow variation rate is at least equal to a threshold at which a data input motion of the user input means can be detected.

* * * * *